(12) United States Patent
Vouzelaud et al.

(10) Patent No.: US 10,931,028 B2
(45) Date of Patent: Feb. 23, 2021

(54) COMPACT ELECTRONIC SCANNING ANTENNA

(71) Applicant: THALES, Courbevoie (FR)

(72) Inventors: Franck Vouzelaud, Paris (FR); Jean-Luc Fauquembergue, Elancourt (FR)

(73) Assignee: THALES, Courbevoie (FR)

( * ) Notice: Subject to any disclaimer, the term of this patent is extended or adjusted under 35 U.S.C. 154(b) by 87 days.

(21) Appl. No.: 15/529,471

(22) PCT Filed: Nov. 25, 2015

(86) PCT No.: PCT/EP2015/077584
§ 371 (c)(1),
(2) Date: May 24, 2017

(87) PCT Pub. No.: WO2016/087274
PCT Pub. Date: Jun. 9, 2016

(65) Prior Publication Data
US 2017/0264023 A1 Sep. 14, 2017

(30) Foreign Application Priority Data
Dec. 3, 2014 (FR) ...................................... 1402751

(51) Int. Cl.
*H01Q 21/00* (2006.01)
*H01Q 1/02* (2006.01)
*H01Q 1/28* (2006.01)
*G01S 7/03* (2006.01)
*G01S 13/02* (2006.01)

(52) U.S. Cl.
CPC ......... *H01Q 21/0025* (2013.01); *G01S 7/034* (2013.01); *H01Q 1/02* (2013.01); *H01Q 1/28* (2013.01); *H01Q 21/0087* (2013.01); *G01S 13/02* (2013.01); *G01S 2013/0254* (2013.01)

(58) Field of Classification Search
CPC ............ H01Q 1/02; H01Q 1/28–1/281; H01Q 21/00–21/0037; H01Q 21/0087; H01Q 21/06; H01Q 21/24; G01S 13/02; G01S 2013/0245–2013/0263
USPC .................................. 343/705, 708, 853, 893
See application file for complete search history.

(56) References Cited

U.S. PATENT DOCUMENTS

| | | | | |
|---|---|---|---|---|
| 4,998,181 A * | 3/1991 | Haws | ..................... | F28D 7/0041 165/80.4 |
| 5,408,240 A * | 4/1995 | Battista | .............. | H01Q 21/0081 333/245 |
| 5,854,607 A | 12/1998 | Kinghorn | | |
| 6,184,832 B1 * | 2/2001 | Geyh | ................. | H01Q 21/0087 343/700 MS |
| 6,297,775 B1 * | 10/2001 | Haws | ...................... | H01Q 1/02 343/700 MS |

(Continued)

*Primary Examiner* — Hasan Z Islam
(74) *Attorney, Agent, or Firm* — BakerHostetler

(57) ABSTRACT

An antenna comprises at least one cold plate serving as main mechanical structure and a set of transmission and reception modules, the modules supplied with electrical power by an electrical power distribution circuit connected to a power source delivering a power supply voltage, the distribution circuit formed by conductive tracks deposited by plasma spraying on the cold plate and crossing the cold plate to reach connection points to the transmission and reception modules.

11 Claims, 4 Drawing Sheets

(56) References Cited

U.S. PATENT DOCUMENTS

| | | | | |
|---|---|---|---|---|
| 6,606,251 | B1* | 8/2003 | Kenny, Jr. | G06F 1/26 |
| | | | | 257/E23.067 |
| 8,654,017 | B1 | 2/2014 | Voss et al. | |
| 9,819,082 | B2* | 11/2017 | Cherrette | H01Q 1/28 |
| 2005/0062648 | A1* | 3/2005 | Ryken | H01Q 1/40 |
| | | | | 343/700 MS |
| 2005/0200533 | A1* | 9/2005 | Brown | H01Q 3/46 |
| | | | | 343/700 MS |
| 2008/0316139 | A1* | 12/2008 | Blaser | H01Q 21/064 |
| | | | | 343/872 |
| 2009/0135085 | A1* | 5/2009 | Raby | H01O 21/0087 |
| | | | | 343/906 |
| 2010/0066631 | A1* | 3/2010 | Puzella | H01Q 1/02 |
| | | | | 343/853 |
| 2010/0245200 | A1* | 9/2010 | Swais | H01Q 1/246 |
| | | | | 343/790 |
| 2013/0016019 | A1* | 1/2013 | Stoneback | H01Q 1/28 |
| | | | | 343/705 |
| 2016/0126629 | A1* | 5/2016 | Cherrette | H01Q 3/34 |
| | | | | 342/372 |

* cited by examiner

COMPACT ELECTRONIC SCANNING ANTENNA

CROSS-REFERENCE TO RELATED APPLICATIONS

This application is a National Stage of International patent application PCT/EP2015/077584, filed on Nov. 25, 2015, which claims priority to foreign French patent application No. FR 1402751, filed on Dec. 3, 2014, the disclosures of which are incorporated by reference in their entirety.

FIELD OF THE INVENTION

The present invention relates to an electronic scanning antenna, notably of tile type. It applies notably for the electronic scanning antennas subjected to high bulk stresses.

BACKGROUND

The future embedded airborne electronic scanning radars will be subjected to high bulk stresses in the case of a compact architecture of transmission/reception modules. This increased compactness as well as weight reduction will be necessary to install these radars in new carriers like drones or to incorporate new functionalities in the front nose cone, such as, for example, multifunction panels.

This so-called "tile" compact antenna architecture compared to the so-called "beam" architecture offers a reduction of the thickness of the antenna of ⅔. This increased compactness must however preserve a correct cooling of the modules and requires more compactness to be gained on all the functions of the antenna, particularly on the power supply circuits. One issue to be resolved is notably how to simplify and make more compact the power supply of the transmission/reception modules E/R in an electronic scanning antenna.

There are many solutions for distributing the power supply from the power supply boards to the transmission and reception modules. All these solutions involve plug-in or pressure connection technology and a distribution by copper tracks in a board or using busbars. Generally, an overall solution combines all these elements.

The busbar is a solid insulated electrical conductor generally made of copper added to the antenna, pierced with holes into which connectors can be screwed for the distribution of power to several electronic components.

Conventionally in an electronic scanning antenna, these busbars are grouped in twos with an electrical insulation separating the supply from the supply return. From a functional point of view, these solutions are satisfactory for antennas with beam or tile architectures, but they make the printed circuits (PCB) more complex to fabricate and the solutions less compact and less accessible.

SUMMARY OF THE INVENTION

One aim of the invention is notably to simplify the electrical power distribution in the electronic scanning antennas to improve their compactness performance characteristics.

To this end, the subject of the invention is an electronic scanning antenna comprising at least one cold plate serving as main mechanical structure and a set of transmission and reception modules, said modules being supplied with electrical power by an electrical power distribution circuit connected to a power source delivering a power supply voltage, said distribution circuit being formed by conductive tracks deposited on said cold plate and crossing said cold plate to reach connection points to said transmission and reception modules.

In a particular embodiment, said conductive tracks are deposited by plasma spraying.

In a particular embodiment, said power source being opposite said separate set of modules relative to said cold plate, said conductive tracks are deposited on the face of the cold plate which is facing the power source, a connector being electrically linked to the tracks at each connection point, said connector passing through said cold plate, each transmission and reception module comprising a connector electrically coupled with a connector linked to said tracks. Said cold plate being pierced with holes for the passage of the through connectors, connectors capable of conveying RF signals pass through, for example, said holes.

An electrical insulation having the same form as said tracks is, for example, arranged between said cold plate and said tracks, said insulation being deposited prior to the tracks by plasma spraying.

In one possible embodiment, the tracks comprise at least two groups of tracks, each group being made up of a main track linked to track branches, one main track being brought to the potential of the power supply voltage and one main track being brought to the ground potential. Said connection points being placed in rows, one track branch at the power supply voltage and one track branch at the ground potential run along, for example, each row. The track branch at the power supply voltage and the track branch at the ground potential are, for example, arranged on each side of the row. The tracks at the ground potential are, for example, in parallel on one and the same layer, said tracks being insulated. In another possible embodiment, the tracks at the power supply voltage and the tracks at the ground potential are superposed, said tracks being insulated.

Each transmission and reception module comprises, for example, an even number of active modules.

BRIEF DESCRIPTION OF THE DRAWINGS

Other features and advantages of the invention will become apparent from the following description, given in light of the attached drawings which represent.

DETAILED DESCRIPTION

Figure 1:
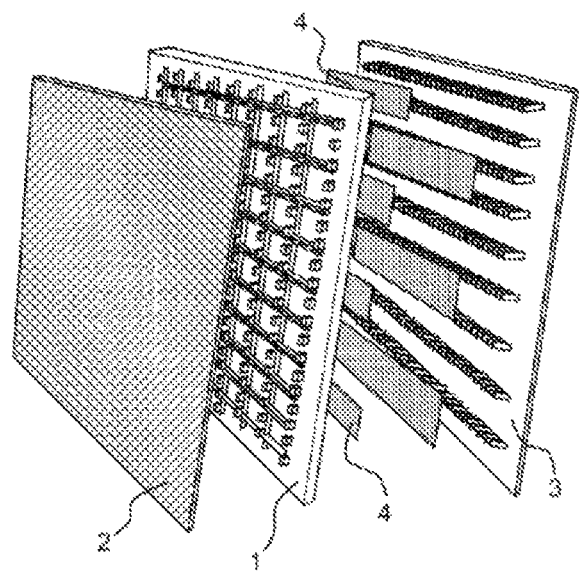
FIG. 1, by an exploded view, elements of an electronic scanning "tile" antenna.

FIG. 1 shows, by an exploded view, elements of a compact electronic scanning "tile" antenna, called "tile", given as an example. Only the elements relating to the electrical power supply are shown. More particularly, FIG. 1 shows a cold plate 1, a plate containing active transmission/reception modules 2 made up of subassemblies or tiles and a control printed circuit 3 as well as a set 4 of RF distributors. The tiles forming the plate containing the active modules 2 are fixed directly onto the cold plate. This plate serves as intermediate mechanical reference for the fixing of elements that are not represented, notably the radiating structure comprising radiant elements of the antenna. This plate 2 comprises, on its outer face, radiofrequency (RF) connectors linking the tiles to the radiant elements.

The cold plate 1 serves as main structure for the antenna part, on the transmission side, called "front end". The plate 1 is used to fix the main elements of this "front end" part. It is passed through by the RF and BF connectors which are aligned in rows in order to facilitate the circulation of a heat transfer liquid in the cold plate.

The RF distributors 4 are fixed onto the other face of the cold plate, opposite the "front end" part. They make it possible to subdivide the antenna into different transmission segments.

In this conventional configuration, the control board 3 also distributes power supplies including the power supply to the transmission and reception modules E/R of the "front end" part, for example by busbars. This board 3 is fixed directly onto the cold plate 1.

The tile comprising, for example, four quadri-modules is fixed directly onto the cold plate. The tile is linked, on the one side, with the RF distributors via connectors, and on the other side with the control and power supply board 3, for example by two BF connectors conveying, in a conventional configuration, control and power supply signals to the E/R modules.

Figure 2:
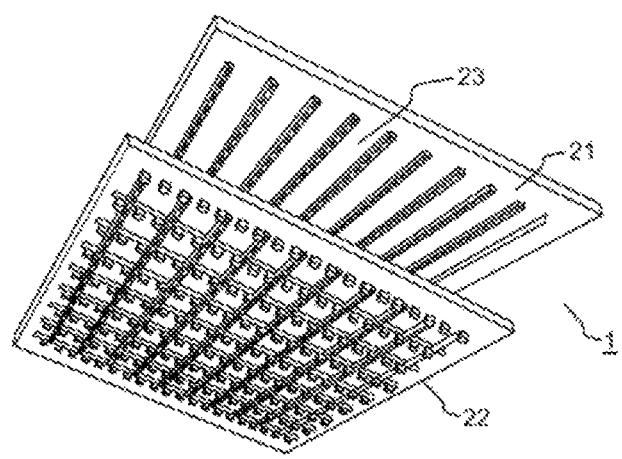
FIG. 2, by an exploded view, a cold plate used in such an antenna.

FIG. 2 shows the cold plate by an exploded view. The cold plate is in fact made up of two parts 21, 22 joined together between which a coolant circulates, the mechanical forms of these parts forming channels 23 for the circulation of the liquid.

This mechanical structure is generally made of aluminum to have good mechanical and thermal characteristics. The parts 21, 22 are machined and assembled by brazing. A layer of protection against oxidation can be applied by a chemical deposition of nickel, for example.

Figure 3A:
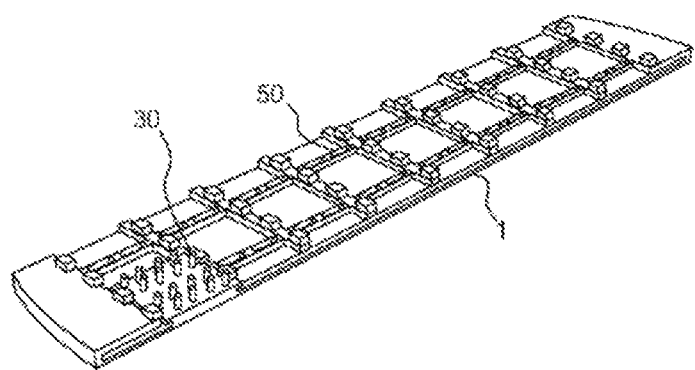
FIGS. 3a and 3b, an illustration of the principle of the invention by an exemplary embodiment.
Figure 3B:
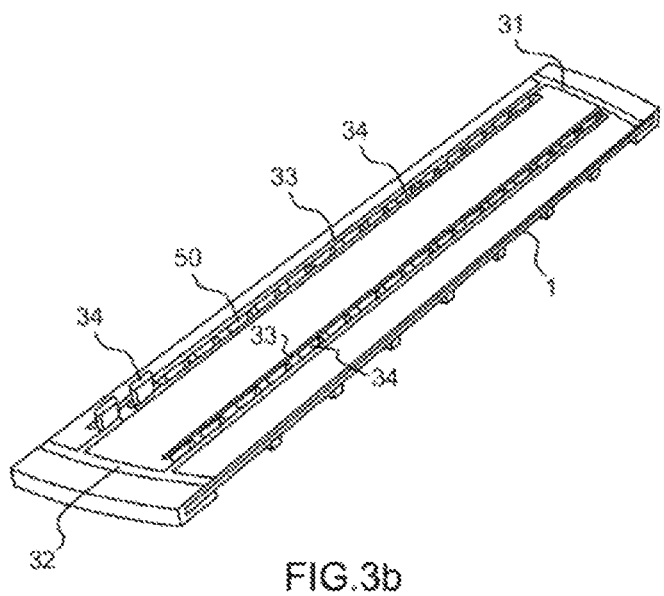

FIGS. 3a and 3b illustrate the principle of the invention from an extract taken from the cold plate 1. FIG. 3a presents the extract taken from the cold plate seen from the "front end" side. More particularly, it describes how a transmission and reception subassembly 30 is mounted on the cold plate. Hereinbelow, this component will without preference be called subassembly or transmission and reception module E/R.

In this example, the E/R module 30 is for example joined to the cold plate by fixing screws in order, notably, to facilitate the dismantling thereof.

FIG. 3b shows the rear face of the extract taken from the cold plate of FIG. 3a.

According to the invention, conductive tracks 31, 32 are deposited on the cold plate in order to create an electrical power distribution circuit to supply the transmission and reception modules 30. The conductive tracks 31, 32 have, for example, several offshoots or branches to access all the E/R modules 30. They cross the surface of the cold plate to reach the connection points to these E/R modules. The cold plate 1 covered by the tracks 31, 32 can be compared to a printed circuit, having the same function as a printed circuit.

The tracks are for example deposited by thermal spraying of plasma spraying type. In a preferred embodiment, these tracks are made of copper.

In the example of FIGS. 3a and 3b, the tracks are deposited on the rear face, opposite the transmission and reception modules 30, facing the printed circuit 30.

To supply the modules, a track 31 or a set of tracks are brought to the power supply voltage, having, for example, a value of 20V to 30V. A track 32 or a set of tracks are brought to the ground potential or any other reference potential.

The connectors being, for example, placed in rows as indicated previously, for each row, the ground track 32 runs on one side 34 of the row while the voltage track 31 runs on another side 33 of the row. It is however possible to have the tracks run on one and the same side to reduce the coupling effects or even have them run superposed.

In FIGS. 3a and 3b, the connectors are not shown, only the holes 50 for the passage of the connectors through the cold plate are shown.

In the configuration shown in FIG. 3b, each track is formed by a main line and branches running along the rows of connectors. Other configurations can however be envisaged.

The copper tracks 31, 32 are insulated from the cold plate 1 using an insulation previously deposited locally. This insulation can be a ceramic or aluminum oxide deposited by a process similar to that used to deposit the copper. In this case, the insulation can have the same form as the tracks. It is also possible to provide an insulation occupying a wider surface than the conductive tracks.

To limit the sources of magnetic field which could be induced by large loop surfaces, the power supply track 31, brought to the power supply voltage, and the return track, brought to the ground potential, are for example conveyed either on one and the same layer in parallel mode or on two levels in superposed mode by applying the same deposition process as for the first layer 31, by plasma spraying. In parallel or superposed mode, the two tracks 31, 32 are insulated, by a space in parallel mode and by an insulation in superposed mode, the insulation then being, for example, deposited by plasma spraying.

Figure 4:
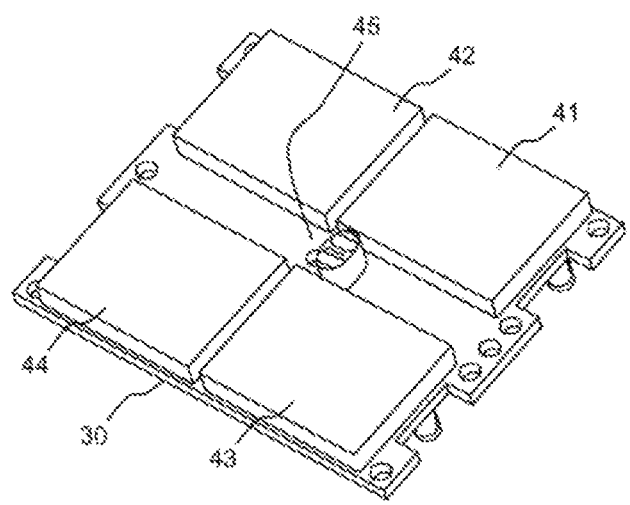
FIG. 4, an example of transmission and reception subassemblies equipped with four active modules.

FIG. 4 shows an E/R subassembly 30 equipped with four active modules 41, 42, 43, 44. To allow it to be connected to the power supply tracks 31, 32, a female connector 45, with a contact that can be plugged into the subassembly, is added. This type of connector can carry a current ranging up to 20A per pin. Higher power contacts can be envisaged depending on the consumption of the modules.

Figure 5A:
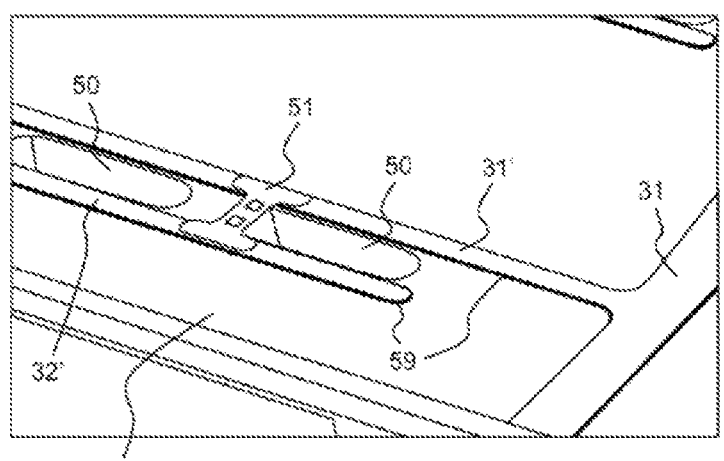
FIGS. 5a and 5b, an illustration of the fixing of a connector onto the power supply tracks in an antenna according to the invention.
Figure 5B:
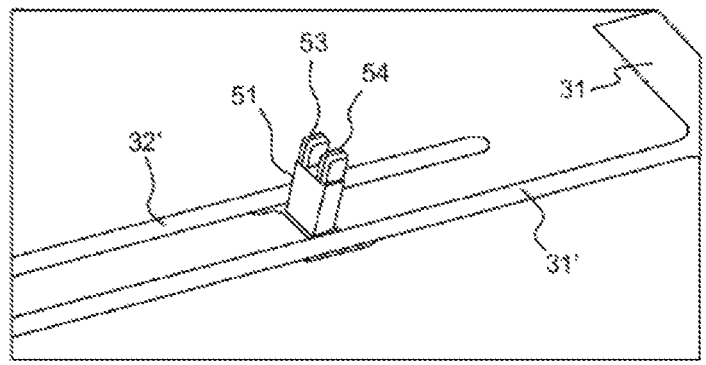

FIGS. 5a and 5b illustrate an example of fixing of the male connector 51 on the copper tracks in the case where the tracks 31, 32 are arranged on each side of the connection points, this conductor 51 being intended to be plugged into the female connector 45 of an E/R module.

FIG. 5a shows the voltage track 31 and one of its branches 31' running along the row of connectors. It also shows a branch 32' of the ground track running along this row. One pole of the connector 51 is connected to the voltage track 31' and the other pole is connected to the ground track 32'. To reduce the bulk, the connector is formed by a body equipped with connection pins and terminated at its base by two conductive perpendicular tongues, the tongues each forming a pole of the connector. These tongues rest on the tracks, ensuring the electrical connection of the connector with the tracks.

The body of the male connector 51 passes through the cold plate via a piercing 50 in order to be able to be plugged into the female connector 45 of an E/R subassembly 30 as shown in FIG. 4. The male connector 51 can be fixed to the tracks by a conventional brazing technique, the fixing being done at the level of the tongues. The position of the connector must be controlled during assembly in order for the subassembly 30 of the E/R modules to be aligned correctly when coupling the male connector 51 with the female connector 45.

FIG. 5a also shows that the copper tracks are mounted on an electrically insulating layer 59.

FIG. 5b shows an artificial view in which only the male connector 51 and the tracks 31, 31' and 32' are shown, the cold plate 1 passed through by the connector not being shown. The male connector 51, fixed to the tracks 31', 32', has sufficient length to pass through the cold plate 1 and to be plugged into the female connector 45 by its pins 53, 54.

FIGS. 5a and 5b show an example of connection in which the connected tracks 31', 32' are on each side of the holes 50, where the connection points are situated. When the tracks 31', 32' are on one and the same layer in parallel mode or on two layers in superposed mode, it is possible to provide another type of connection. The connector used always has a body that can pass through the cold plate and be plugged into a female connector, but its terminations are adapted to be electrically linked to the two tracks, parallel or superposed. In the case of superposed tracks, it is possible to provide a local protuberance of the lower track to allow an electrical link with the connector. Plasma spraying advantageously makes it possible to produce this type of protuberance.

There are as many male connectors 51 as there are subassemblies or transmission and reception modules to be powered. These conductors complement the power supply circuit for these modules. They could be replaced by female connectors, the male connectors then being fixed onto the transmission and reception subassemblies.

The power connectors 51, 45 can be adjacent to RF and control connectors. FIG. 3b shows such connectors 34 also passing through the cold plate 1.

Connectors that are not shown are provided to connect the conductive tracks 31, 32 to the power source which can be placed, for example, on the control and power supply circuit 3, in the form of one or more power supply modules for example. These connectors can be brazed directly onto the tracks or, conversely, receive connectors by pressure in a conventional manner. The power source of the tracks 31, 32 can be placed at another point. More generally, any point of delivery of power or of current to the input of the tracks is considered as a power source.

The invention advantageously makes it possible to improve the compactness performance characteristics of the electronic scanning antennas of tile type. In particular, it does not involve mechanical fixing like fastening screws. It makes is possible to convey high power while minimizing the line losses, the heating of the contacts being reduced by the influence of the cold plate used to efficiently drain the calories given off by joules effect. The magnetic and inductive couplings are minimized. Filtering or storage capacitance elements can easily be adapted and connected to the power supply device. The power can be transmitted by a single go and return pin for a group of modules, as illustrated in FIGS. 4, 5a and 5b.

The invention also has the advantage that, using plasma spraying, it makes it possible to obtain various forms of tracks, capable of adapting to all the configurations, and in particular of easily circumventing obstacles such as protuberances, fixing spacers, or cavities in particular and potentially on different levels. The plasma spraying also makes it possible to locally create particular forms of tracks suited to different types of connections used.

The invention claimed is:

1. An electronic scanning tile antenna, comprising:
   a cold plate serving as main mechanical structure,
   a set of transmission and reception modules being supplied with electrical power by an electrical power distribution circuit, said electrical power distribution circuit connected to a power source delivering a power supply voltage,
   wherein said power source is opposite said set of transmission and reception modules relative to said cold plate, and said electrical power distribution circuit is formed by conductive tracks deposited on said cold plate and crossing said cold plate to reach connection points to said set of transmission and reception modules, said conductive tracks being deposited on a face of the cold plate which is facing the power source, and
   a male connector being electrically linked to the conductive tracks at each connection point, said male connector passing through said cold plate, wherein each transmission and reception module comprising a female connector electrically coupled with a respective male connector linked to said conductive tracks.

2. The antenna as claimed in claim 1, wherein said conductive tracks are deposited by plasma spraying.

3. The antenna as claimed in claim 1, wherein, said cold plate being pierced with holes for the passage of through connectors capable of conveying RF signals pass through said holes.

4. The antenna as claimed in claim 1, wherein an electrical insulation having a same form as said conductive tracks is arranged between said cold plate and said conductive tracks, said insulation being deposited prior to the conductive tracks by plasma spraying.

5. The antenna as claimed in claim 1, wherein said conductive tracks comprise at least two groups of tracks, each group being made up of a main track linked to track branches, one main track being brought to a potential of the power supply voltage and another main track being brought to a ground potential.

6. The antenna as claimed in claim 5, wherein, said connection points being placed in rows, one track branch at the power supply voltage and one track branch at the ground potential run along each row.

7. The antenna as claimed in claim 6, wherein the track branch at the power supply voltage and the track branch at the ground potential are arranged on each side of the row.

8. The antenna as claimed in claim 5, wherein the tracks at the power supply voltage and the tracks at the ground potential are in parallel on one and a same layer, said tracks being insulated.

9. The antenna as claimed in claim 5, wherein the tracks at the power supply voltage and the tracks at the ground potential are superposed, said tracks being insulated.

10. The antenna as claimed in claim 1, wherein each transmission and reception module comprises an even number of active modules.

11. The antenna as claimed in claim 1, wherein the conductive tracks are made of copper.

* * * * *